J. W. ARTHUR.
APPARATUS FOR REPAIRING TIRES.
APPLICATION FILED FEB. 28, 1920.
1,344,847.
Patented June 29, 1920.
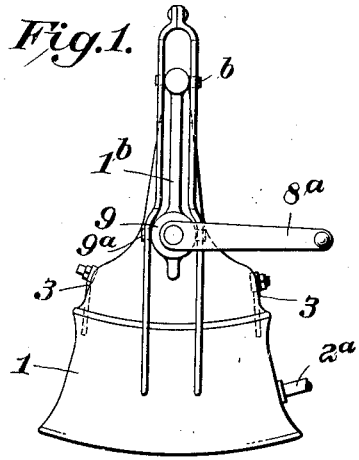
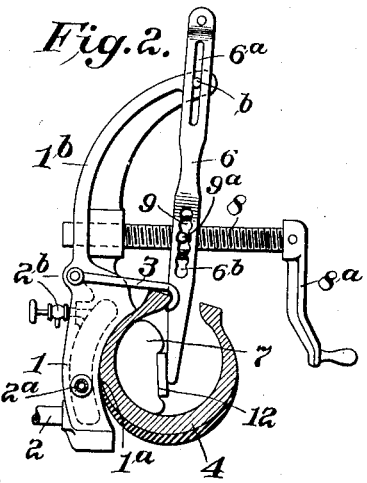
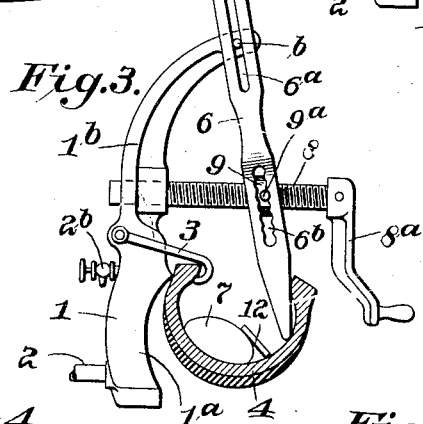
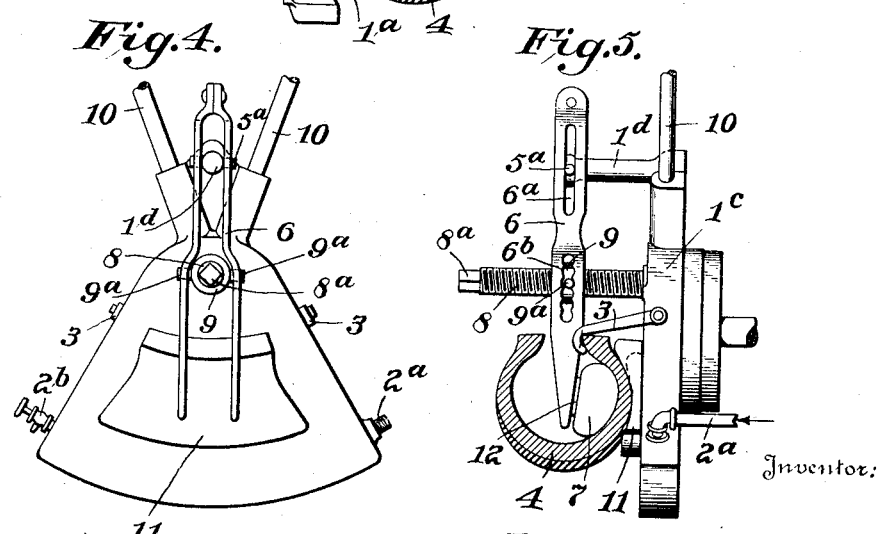
Inventor:
James W. Arthur,
By Spear Middleton Donaldson & Hall
Attorneys.

UNITED STATES PATENT OFFICE.

JAMES W. ARTHUR, OF AKRON, OHIO, ASSIGNOR TO THE WILLIAMS FOUNDRY & MACHINE COMPANY, OF AKRON, OHIO, A CORPORATION OF OHIO.

APPARATUS FOR REPAIRING TIRES.

1,344,847.      Specification of Letters Patent.      Patented June 29, 1920.

Application filed February 28, 1920. Serial No. 362,098.

*To all whom it may concern:*

Be it known that I, JAMES W. ARTHUR, a citizen of the United States, and a resident of Akron, in the county of Summit and State of Ohio, have invented certain new and useful Improvements in Apparatus for Repairing Tires, of which the following is a specification.

My present invention relates to improvements in repairing the side walls of pneumatic tires and is especially adapted for those of large size such as are commonly known as "giant tires."

The invention aims to provide a simple, economical and efficient form of apparatus by which patches may be expeditiously vulcanized on the side walls of such tires and the heat confined to the portion being patched or vulcanized.

The invention further aims to provide a construction readily adaptable to various sizes of tires, and to include means for enabling the sand bag commonly used to be readily inserted and removed.

With these and other objects in view, the invention includes the novel features of construction and arrangement and combination of parts hereinafter described and particularly defined by the appended claims.

An embodiment of my invention is illustrated in the accompanying drawing in which:

Figure 1 is a side elevation of a vulcanizer embodying my invention;

Fig. 2 is a view at right angles to Fig. 1, showing the parts in vulcanizing position; and Fig. 3 is a similar view showing the tire in spread position for insertion and removal of the sand bag.

Fig. 4 is a side view of a modified form; and

Fig. 5 is a view at right angles thereto.

Referring by reference characters to this drawing the numeral 1 designates a vulcanizing member having a curved face $1^a$ to fit approximately the side wall of the tire, this member being hollow to provide a steam space to which steam is admitted through a nipple or pipe connection 2 adapted to be connected to the steam line, a return steam connection being provided as indicated at $2^a$, and a vent cock at $2^b$. Pivoted to opposite sides of this member are two tire retaining hooks 3, which are designed to engage with one of the edges of the tire or casing 4 to retain it initially in position and enable it to be spread in the manner hereinafter described.

The member 1 has an upwardly and laterally extended portion $1^b$ or arm from which is pivotally and slidably suspended a presser bar or lever 6.

A form of connection between the bracket arm 5 and presser bar or lever 6 which I have found desirable is to provide the end of the bracket arm with laterally extending pivot projections $5^b$ and to construct the presser lever 6 as a bifurcated member, the side bars or portions of which are provided with elongated slots $6^a$ to receive the pivot projections $5^b$.

The lower end of the presser bar is designed to penetrate through the open belly of the tire and serve both for spreading the same and for coacting with the usual sand bag or pad (indicated at 7) to force the side wall of the tire against the vulcanizing surface with the requisite pressure. Suitable means are provided for moving the free or lower end of the presser bar or lever toward and from the vulcanizing surface, preferably in the shape of screw 8 having one end suitably journaled in the vulcanizing member or arm $1^b$ thereof, and the other end provided with a suitable crank or handle $8^a$ for turning the screw. The intermediate portion of the screw carries a traveling nut 9 which is provided with wing pins $9^a$ engaging openings in the presser bar. The presser bar is preferably constructed bifurcated, conveniently of two bars or members connected at their upper ends and having their lower portions provided with slots with notched or recessed edges as indicated at $6^b$ to receive the pins or projections $9^a$ and permit the vertical adjustment of the latter, the pins or projections $b$ being correspondingly shifted in the slots $6^a$. As soon as the screw is turned to swing the lever in either direction, the projections $9^a$ are forced into engagement with the recessed edges and slipping of the projections is prevented.

In the form shown in Figs. 4 and 5, I provide the vulcanizer with manipulating handles 10 and I also form the vulcanizer chamber with a flat face to which curved profile plates 11 shaped to fit various sized tires may be interchangeably applied. In this form instead of carrying the screw by a curved arm I provide for this purpose a laterally extending post 1ᵈ.

From the foregoing description, it is believed the operation of my device will be obvious but it may be briefly stated as follows:

One side of a tire is placed in position against the vulcanizing surface, and the adjacent edge is engaged by the retaining hooks 3. The screw is then rotated in the proper direction to force the presser bar away from the retained edge, spreading the edges of the tire apart sufficiently to enable the sand bag to be inserted as shown in Fig. 3. A presser plate 12 is preferably inserted between the bag and presser bar and thereafter the screw is rotated in the reverse direction to force the bag and through it the tire wall, with its applied patch, against the vulcanizing surface as shown in Figs. 2 and 5.

Steam is then turned on to effect vulcanization.

Having thus described my invention, what I claim is:

1. Apparatus for repairing the side walls of tires comprising a vulcanizing member, means for engaging one edge of a tire to hold the tire wall in proximity to said vulcanizing member, and a presser bar adapted to penetrate the tire with means for moving it toward and from the vulcanizing member.

2. Apparatus for repairing the side walls of tires comprising a vulcanizing member, means for engaging one edge of a tire to hold the wall in proximity to said vulcanizing member, and a pivoted presser bar adapted to penetrate the tire with means for moving it toward and from the vulcanizing member.

3. Apparatus for repairing the side walls of tires comprising a vulcanizing member, a hook pivoted thereto for engaging one edge of a tire to hold the side wall thereof in proximity to the vulcanizing member, and a presser bar adapted to penetrate the tire with means for moving it toward and from the vulcanizing member.

4. Apparatus for vulcanizing the side walls of tires comprising a vulcanizing member, means for retaining one edge of the tire in proximity to said member, a presser bar having one end pivotally connected with said member and the other end adapted to penetrate the tire, and means for swinging said bar.

5. Apparatus for vulcanizing the side walls of tires comprising a vulcanizing member, an arm carried thereby and projecting beyond the plane of the face of said member, means carried by said vulcanizing member for detachably engaging one edge of a tire, a presser bar having its upper portion slidably pivoted to said arm and its lower end adapted to penetrate the tire, and means for swinging said presser bar toward and from the vulcanizing member.

6. Apparatus for vulcanizing the side walls of tires comprising a vulcanizing member, means carried thereby for engaging the side wall of a tire, a presser bar having its upper end pivotally supported from the vulcanizing member, and its lower end adapted to penetrate the tire, and screw means connected with the vulcanizing member and adapted to swing said lower end of the bar toward and from the vulcanizing member.

7. Apparatus for vulcanizing the side walls of tires comprising a vulcanizing member, a removable profile plate fitting against said member, means for engaging one edge of the tire to hold the same in proximity to said profile plate, and a presser bar for penetrating the tire with means for moving it toward and from the vulcanizing member.

In testimony whereof I affix my signature.

JAMES W. ARTHUR.